Aug. 16, 1938.   H. McINTYRE   2,126,795
ROTARY INTERNAL COMBUSTION ENGINE
Filed Feb. 1, 1937   9 Sheets-Sheet 2

INVENTOR
H. McINTYRE
BY
ATTORNEYS.

Aug. 16, 1938.   H. McINTYRE   2,126,795
ROTARY INTERNAL COMBUSTION ENGINE
Filed Feb. 1, 1937   9 Sheets—Sheet 6

INVENTOR
H McINTYRE
BY
ATTORNEYS.

Aug. 16, 1938.  H. McINTYRE  2,126,795
ROTARY INTERNAL COMBUSTION ENGINE
Filed Feb. 1, 1937  9 Sheets-Sheet 7

INVENTOR
H McINTYRE
BY
ATTORNEYS

Aug. 16, 1938.　　　　　H. McINTYRE　　　　　2,126,795
ROTARY INTERNAL COMBUSTION ENGINE
Filed Feb. 1, 1937　　　9 Sheets—Sheet 9
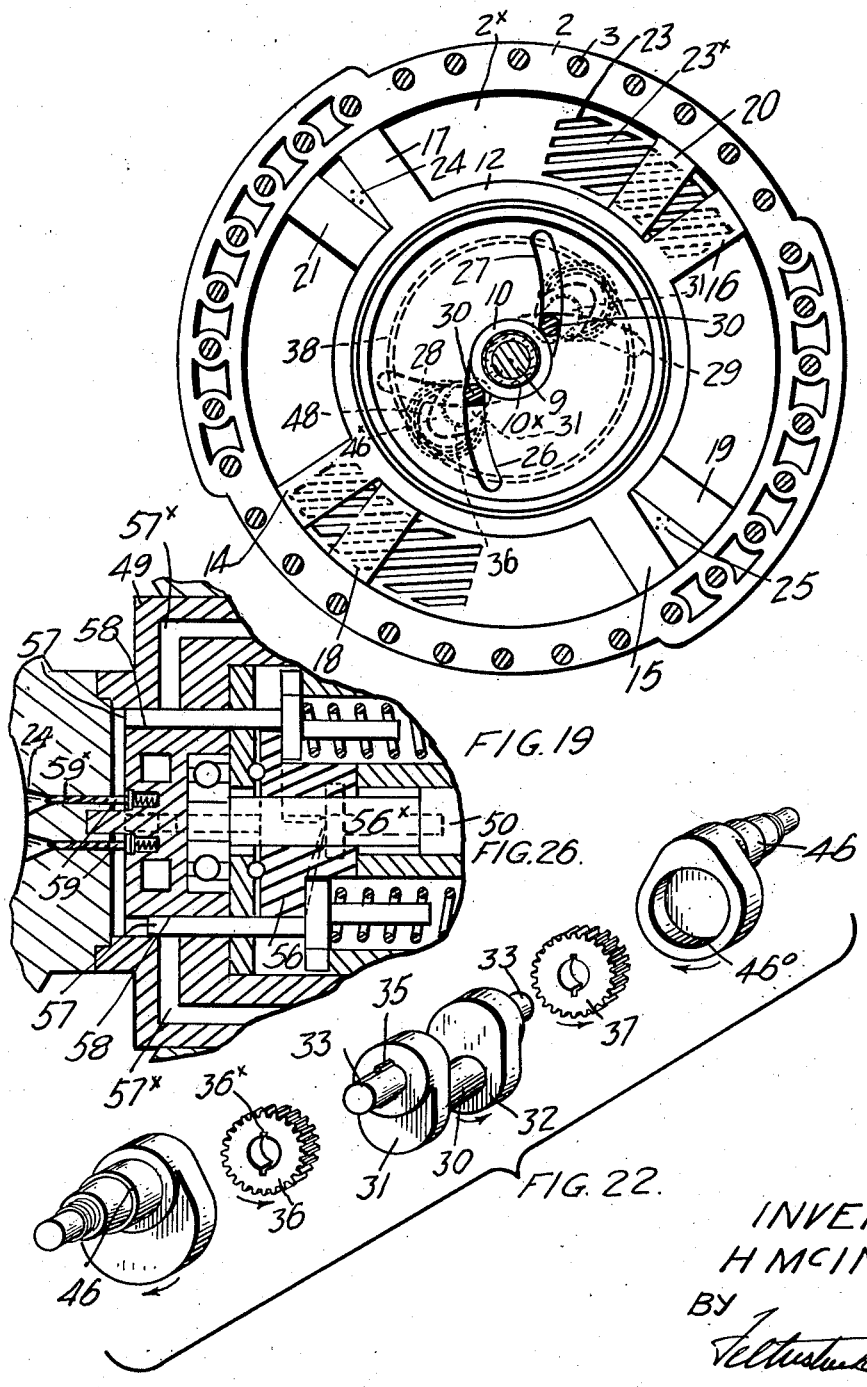
INVENTOR
H MCINTYRE
BY
ATTORNEY.

Patented Aug. 16, 1938

2,126,795

UNITED STATES PATENT OFFICE 2,126,795

ROTARY INTERNAL COMBUSTION ENGINE

Hugh McIntyre, Kirkland Lake, Ontario, Canada

Application February 1, 1937, Serial No. 123,354

6 Claims. (Cl. 123—11)

My invention relates to improvements in rotary internal combustion engines, and the object of the invention is to provide an engine which will be extremely light in proportion to the power developed, which will be simple in construction and have a reduced number of working parts, in which all valves are eliminated, in which there is continuity of torque eliminating the necessity for a heavy fly wheel and making the power output independent of the speed of the engine's rotation, in which high piston speed is produced developing a very high heat efficiency, in which the engine is balanced and in which there is no change of direction of piston movement producing freedom from vibration due to reciprocating parts, in which there is a longer power stroke than compression stroke so that the pressure at the point of exhaust at normal speed is equal to atmospheric pressure ensuring full use of power and eliminating exhaust noise, in which there is complete scavenging of the burnt gases, in which one hundred per cent pure air is provided for each compression stroke, in which there is no vacuum created on the induction stroke and very little loss of power due to this cause, and in which each piston is cooled at the completion of each power stroke by fresh air contacting therewith, and it consists essentially of the arrangement and construction of parts all as hereinafter more particularly explained.

Fig. 4 is a perspective detail showing the crank mechanism in the position it assumes in Fig. 3.

Fig. 8 is a similar view to Fig. 4 showing the crank mechanism in the position corresponding to Fig. 7.

Fig. 10 is a perspective detail of the crank mechanism similar to Fig. 4 in the position assumed in connection with Fig. 9.

Fig. 12 is a perspective detail of the crank mechanism similar to Fig. 4 and corresponding to the position of Fig. 11.

Fig. 14 is a perspective detail of the crank mechanism similar to Fig. 4 and illustrating the position of the cranks corresponding to Fig. 13.

Fig. 16 is a perspective detail of the crank mechanism similar to Fig. 4 and corresponding to the position assumed in Fig. 15.

Fig. 19 is a similar view to Fig. 3 showing the pistons in the position they assume at the end of the second half of the cycle of movement.

Fig. 22 is a perspective detail of one of the crank mechanisms showing the parts thereof separated apart and the ball bearings removed.

Fig. 26 is a fragmentary sectional view through one of the injector mechanisms.

In the drawings like characters of reference indicate corresponding parts in each figure.

The body of the engine is formed by two members 1 and 2 connected together on the centre line of the engine by connecting bolts 3. The members 1 and 2 are provided with semi-cylindrical annular portions 1× and 2× which, when the parts 1 and 2 of the engine are bolted together, form an annular engine cylinder. The centre portion of the members 1 and 2 is formed cylindrical as indicated at 1⁰ and 2⁰ and centrally of these portions is formed an annular disc containing space as indicated at 4.

Figure 21:
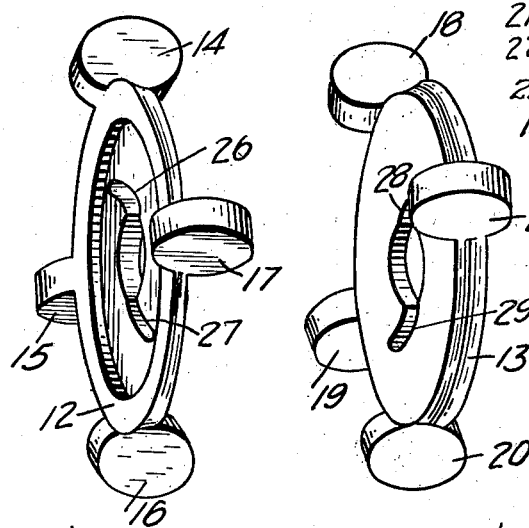
Fig. 21 is a perspective detail on a reduced scale of the pistons and their carriers showing the carriers separated apart.

5 and 6 are end plates which are secured by bolts 38× and 39× to the engine body at the outer ends of the cylindrical portions 1⁰ and 2⁰. The plates 5 and 6 are provided with central recesses 5× and 6× containing main bearings 7 and 8 in which the main shaft 9 of the engine is mounted. 10 and 11 are sleeves mounted on the central portion of the engine shaft 9 and provided with an intervening bushing 10×. 12 and 13 are annular discs which are contained within the disc containing space 4 so as to surround the sleeves 10 and 11, the inner periphery of the disc fitting such sleeves and the outer periphery of the disc being curved so as to correspond with the curvature of the annular cylinder formed by the semi-cylindrical portions 1× and 2×. The discs 12 and 13 are shown in detail in Fig. 21.

14, 15, 16 and 17 are pistons which fit the annular cylinder formed by the members 1× and 2×, such piston being integral with the disc 12 which forms a carrier therefor. 18, 19, 20 and 21 are pistons which also fit the cylinder formed by the portions 1× and 2× and are formed integral with the disc 13. When the discs 12 and 13 are placed face to face in position within the engine, the pistons 14, 15, 16 and 17 alternate with the pistons 18, 19, 20 and 21.

22 and 23 are combined air inlet and exhaust ports located at each side of the engine cylinder in alignment one with the other and formed by grates 22× and 23×. A centre pin 22⁰ is used to divide the flow of incoming air so that a small portion passes transversely for scavenging and a larger portion of fresh air passes transversely ahead of the pistons for compression when the pistons make their compression strokes. By this means a free passage of pure air is permitted to pass from one side of the cylinder to the other.

Figure 3:
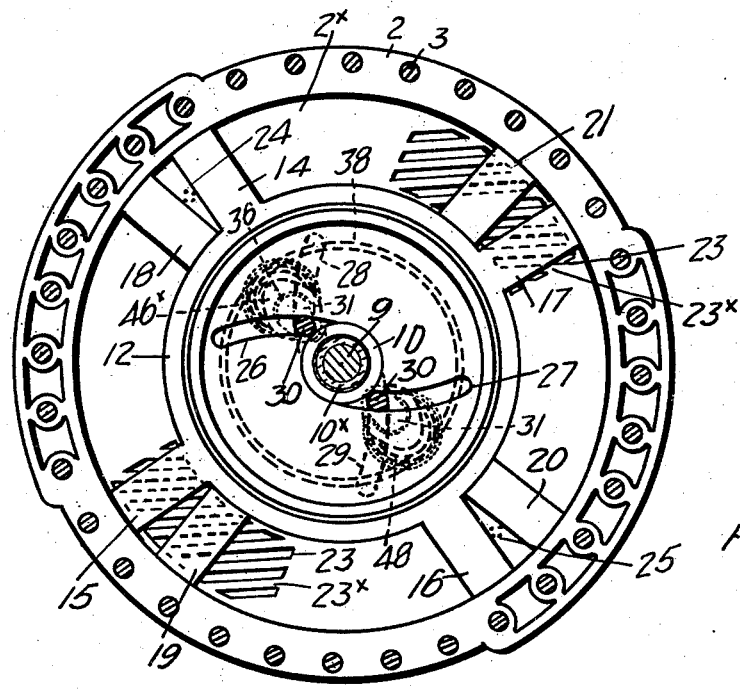
Fig. 3 is a view similar to Fig. 2 on a reduced scale showing the pistons in the firing and final exhaust positions.
Figure 5:
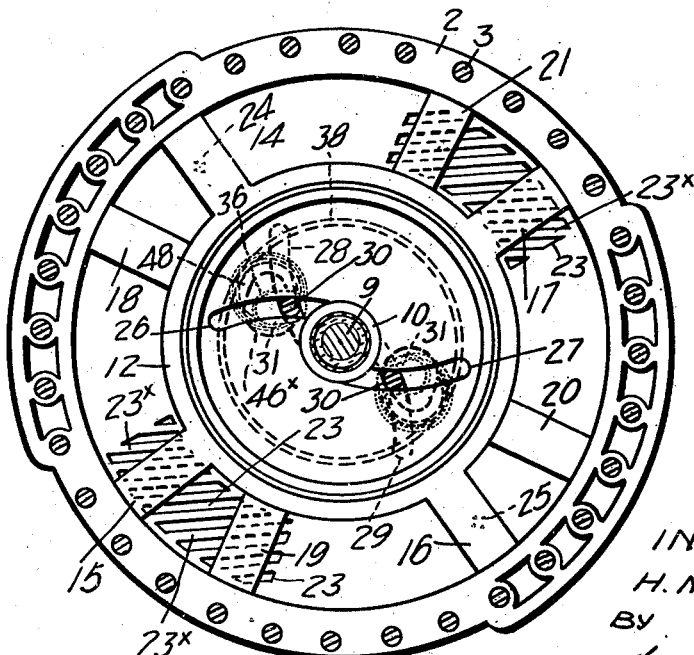
Fig. 5 is a similar view to Fig. 3 showing the position of the pistons during their power and compression strokes.
Figure 6:
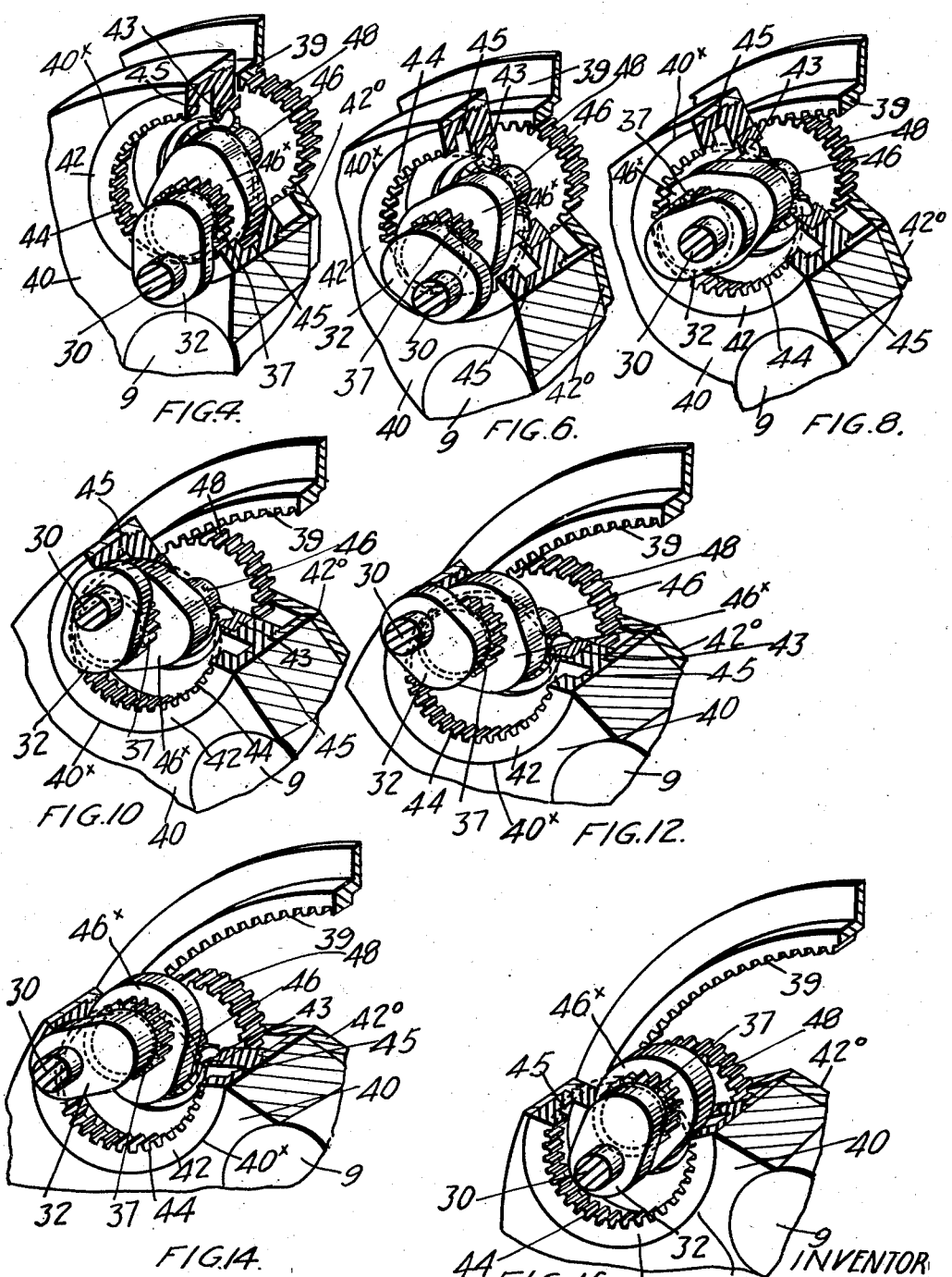
Fig. 6 is a similar view to Fig. 4 showing the position of the crank mechanism corresponding to that shown in Fig. 5.
Figure 7:
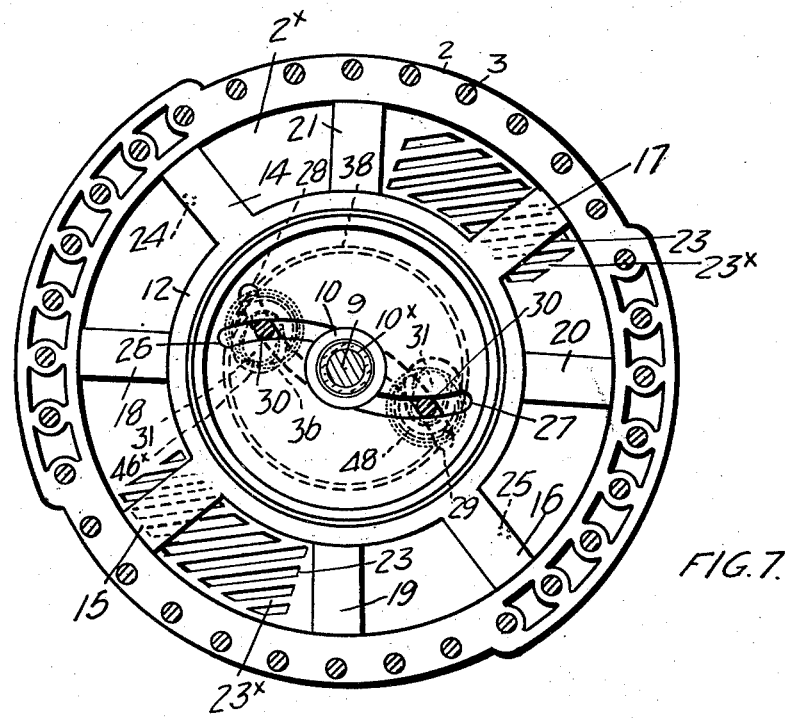
Fig. 7 is a similar view to Fig. 3 showing the pistons in the position they assume during the power, compression, exhaust and induction strokes.
Figure 9:
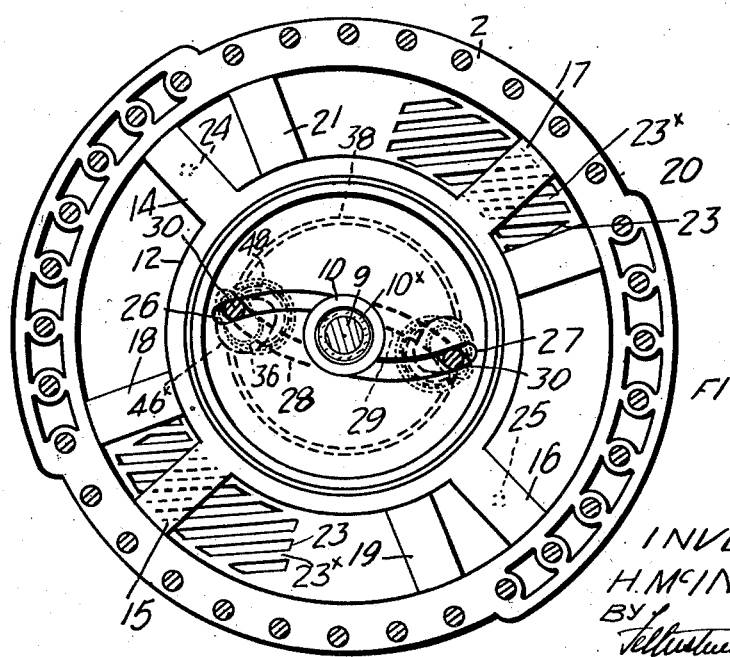
Fig. 9 is a similar view to Fig. 3 showing the pistons in the position they assume near the completion of the power, compression, induction and exhaust strokes.
Figure 11:
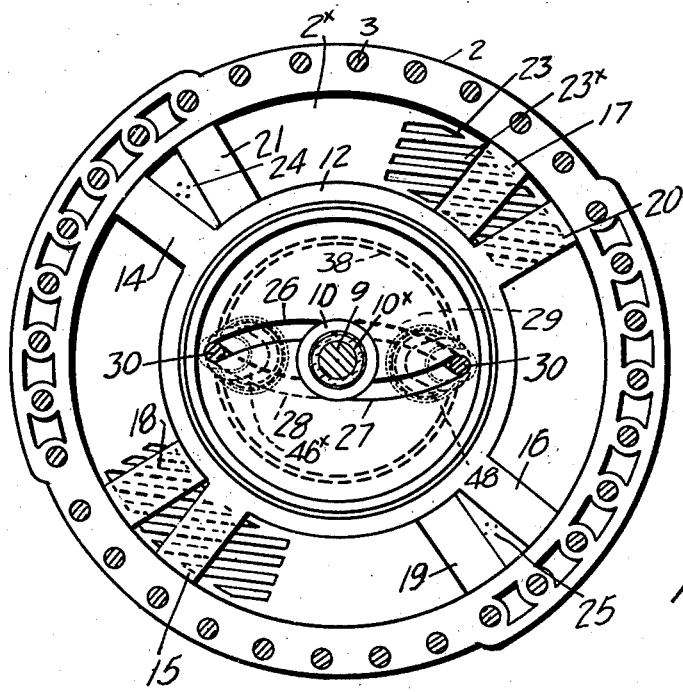
Fig. 11 is a similar view to Fig. 3 showing the pistons in the positions they assume at the completion of the compression stroke and the commencement of the induction and compression strokes during the second half of the cycle of operation.
Figure 13:
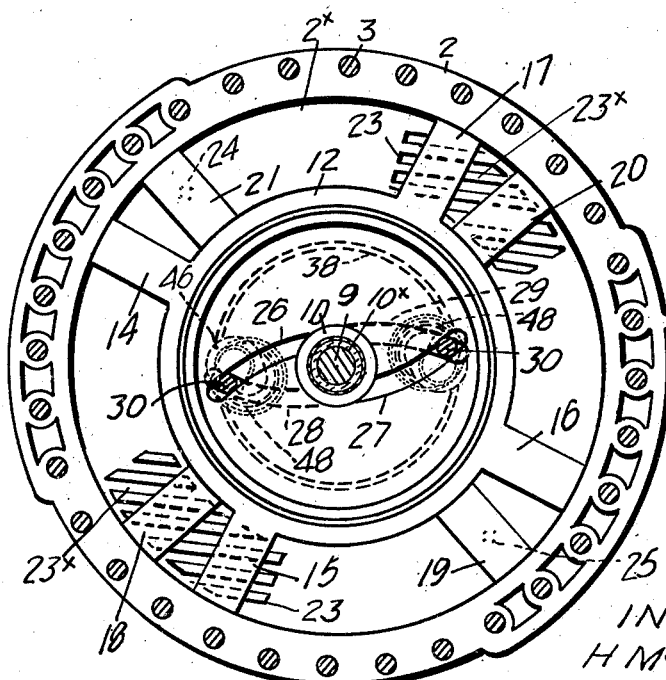
Fig. 13 is a similar view to Fig. 4 showing the pistons in the positions they assume during the power, exhaust and compression strokes of the second half of the cycle.
Figure 15:
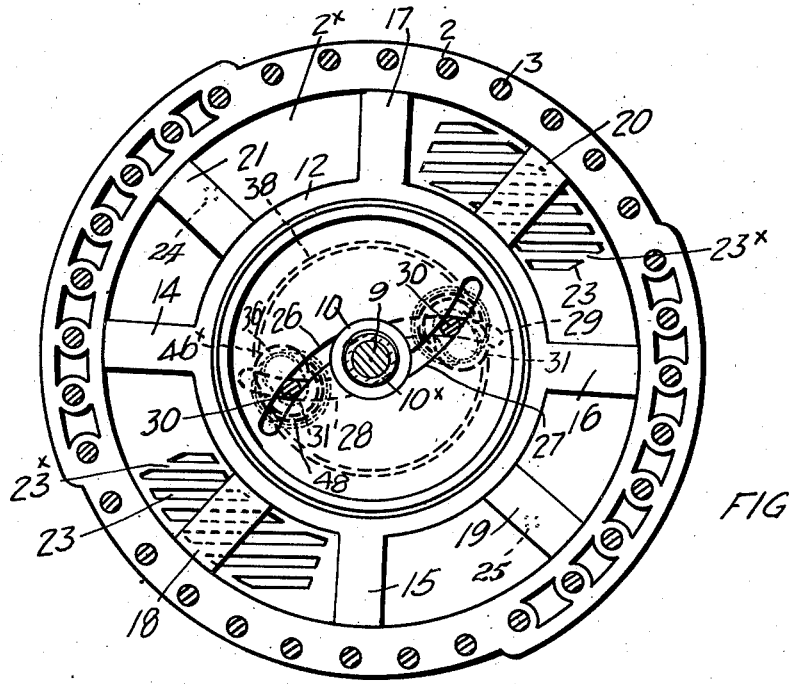
Fig. 15 is a similar view to Fig. 3 showing the pistons in the positions they assume during the power, compression, exhaust and induction strokes of the second half of the cycle.
Figure 17:
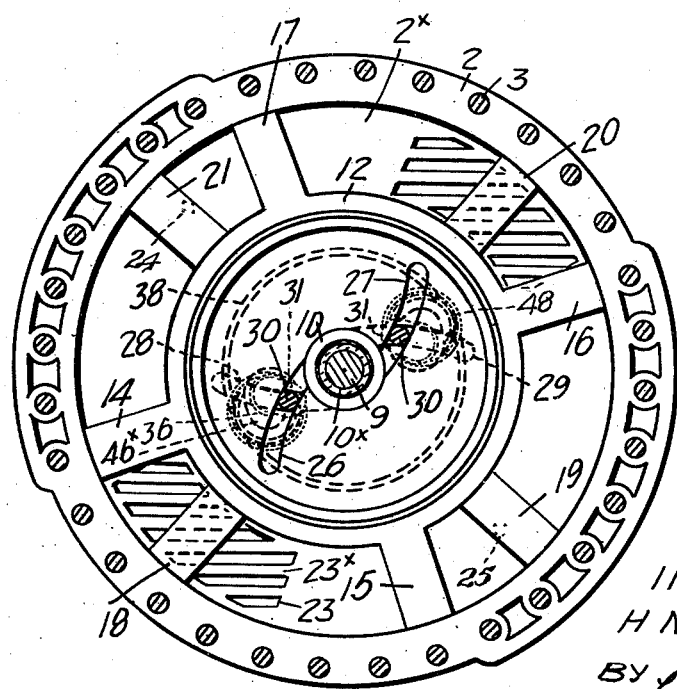
Fig. 17 is a similar view to Fig. 3 showing the pistons in the position they assume near the end of the power, compression, exhaust and induction strokes.
Figure 18:
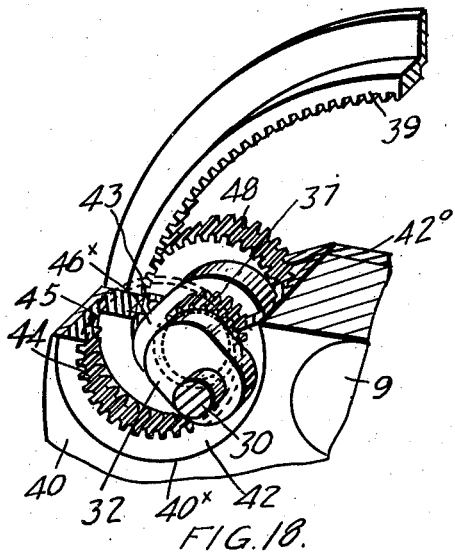
Fig. 18 is a perspective detail of the crank mechanism similar to Fig. 4 showing the parts in the position they assume corresponding to that in Fig. 17.
Figure 20:
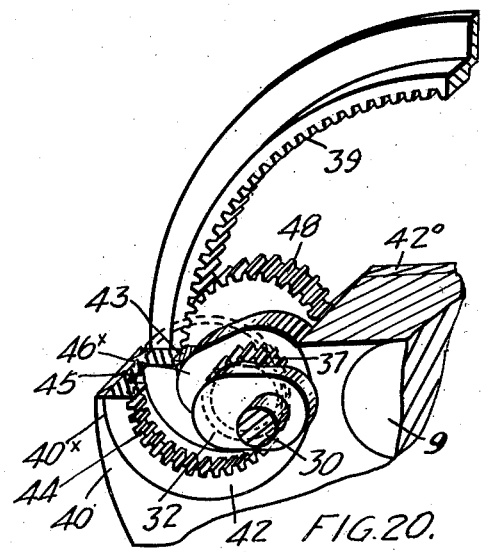
Fig. 20 is a perspective detail of the crank mechanism similar to Fig. 4 and corresponding in position to the position assumed in Fig. 19.
Figure 23:
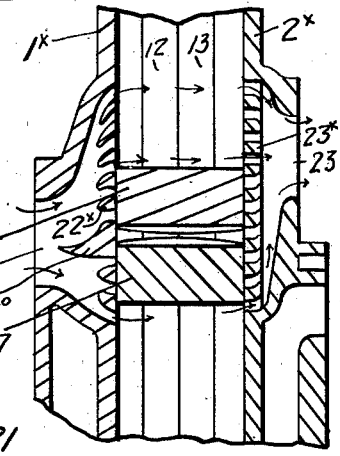
Fig. 23 is a sectional detail through the annular cylinder of the engine taken through the combined air inlet and exhaust ports.

Referring to Fig. 3, a charge of air compressed to the firing point fills the space between the pistons 14 and 18 and the space between the pistons 16 and 20 into which space atomized fuel is discharged by the injector, hereinafter referred to, through orifices 24 and 25. The fuel so injected is fired by the heat generated by the compression of the air within the space between the pistons 14 and 18 and 16 and 20.

When the explosion takes place normally if the pistons were in a stationary position they would be driven equally in opposite directions. The pistons 18 and 20 are driven in the direction of rotation, the extent of the movement being equal to that due to the exploded gases plus that due to rotation. The pistons 14 and 16 also travel in the direction of rotation and are driven by the exploding gases in an opposite direction to the direction of rotation. The resulting movement is a minus movement, that is the extent of the movement is due to the rotation minus that due to the explosion and is sufficient to carry the pistons 14 and 16 from one side of the point of injection to the opposite side of such point. These pistons then successively assume the positions illustrated in Figs. 5, 7, 9 and 11, the pistons 14, 15, 16 and 17 being connected to one carrier disc 12 and the pistons 18, 19, 20 and 21 to the other carrier disc 13. As previously described the above movement of the pistons 18 and 20 will be transferred to the pistons 21 and 19 and the movement of the pistons 14 and 16 will be transferred to the pistons 17 and 15.

In the position of the pistons 17 and 21 and the pistons 15 and 19 opposite the exhaust ports, the space between these pistons has been scavenged and the space between the pistons 21 and 14 and between the pistons 19 and 16 will be filled with pure air which will be compressed by the forward movement of the pistons 21 and 19 towards the relatively stationary pistons 14 and 16. The pistons 17 and 15 moving in unison with the pistons 14 and 16 and in the direction of rotation slowly uncover a portion of the exhaust ports 22 and 23 so that the pistons 18 and 20 as they travel forward during their power stroke force the burnt gases through the portions of the exhaust ports uncovered by the forward movement of the pistons 17 and 15. When this movement is complete the pistons 14 and 21 are situated at each side of one point of injection and the pistons 19 and 16 at each side of the other point of injection so that for the next piston movements the pistons 14 and 16 become the driving pistons and the pistons 21 and 19 relatively stationary heads against which the next explosion takes place.

It will thus be seen that the disc carriers alternately operate in a forward direction by a repeated forward rocking movement.

I will now describe the means by which the drive of the pistons is transferred to the drive shaft of the engine.

Figure 1:
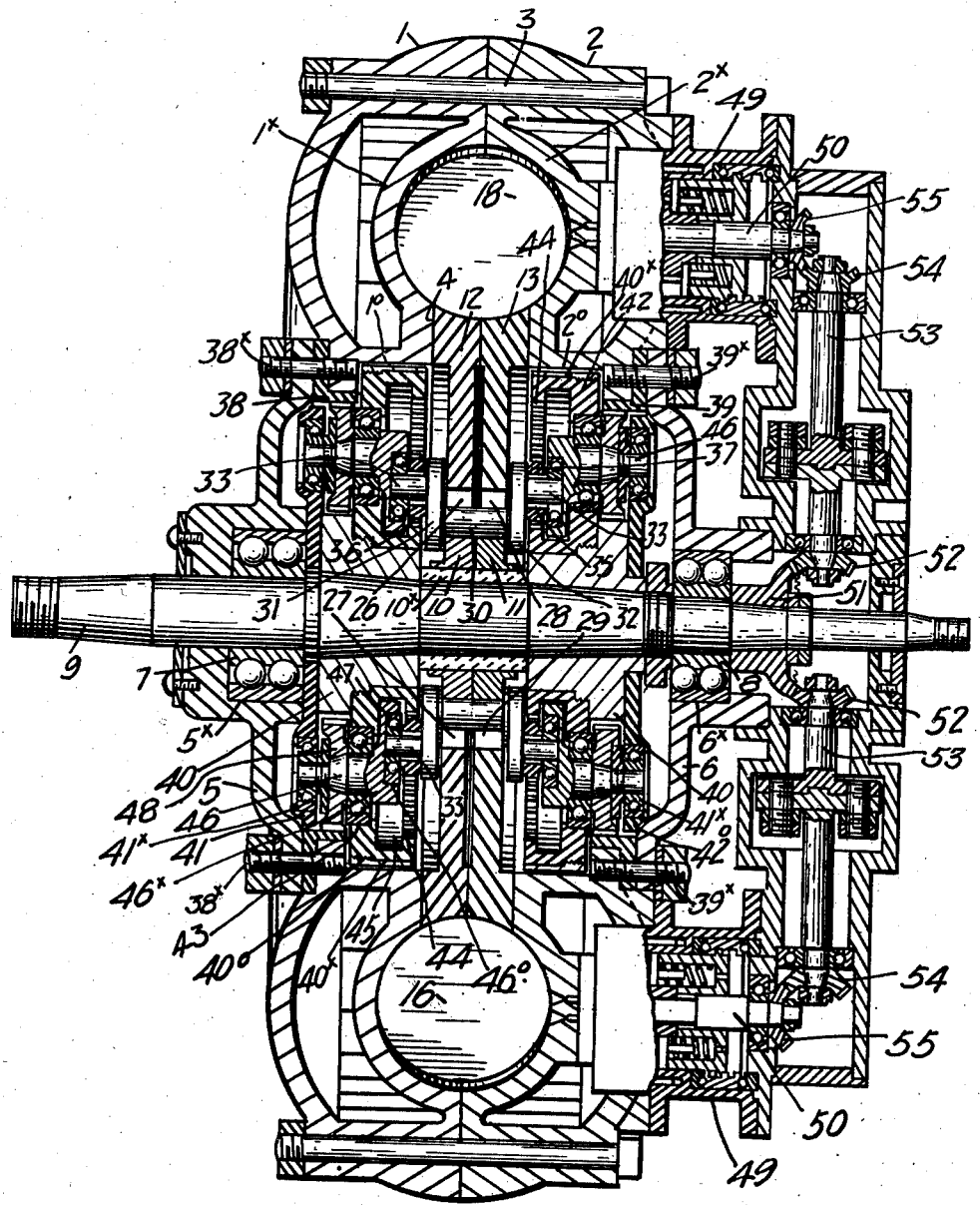
Fig. 1 is a sectional view through the engine on line 1—1 Fig. 2.
Figure 2:
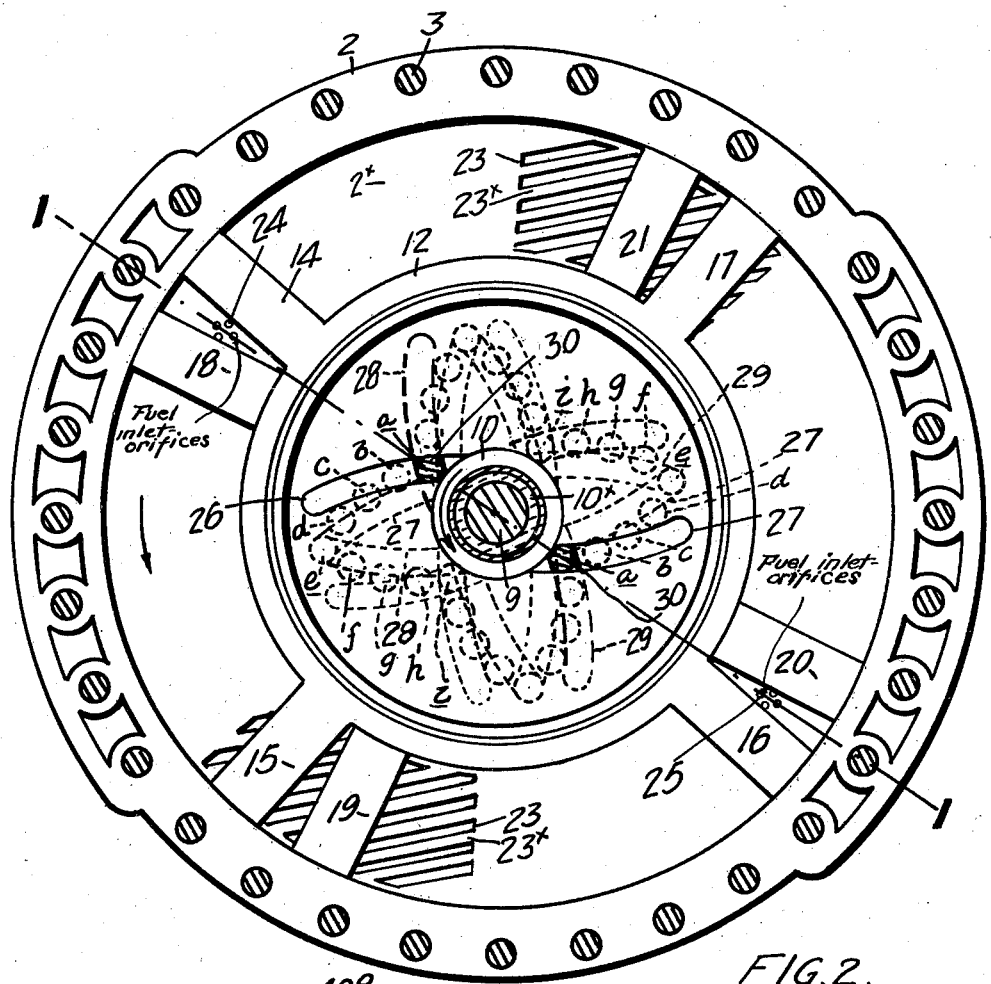
Fig. 2 is a sectional view through the centre of Fig. 1 showing the pistons and piston carrier discs in full and the path of travel of the centre crank pin of the engine and the main position of the actuating slots in dotted lines.

The disc carriers for the pistons are provided with curved slots, the carrier 12 having the slots 26 and 27 and the carrier 13 having the slots 28 and 29. When the discs are placed together in a face to face position with the pistons at the firing position, the inner ends of the slots 26 and 28 are in alignment and the inner ends of the slots 27 and 29 are in alignment, these slots curving outwardly in opposite directions as clearly indicated in Fig. 2.

In an engine such as described, I employ two crank mechanisms each of which is provided with a centre crank pin 30. A crank pin 30 extends through the slots 26 and 28 and a crank pin 30 extends through the slots 27 and 29. From each of the crank pins 30 extend crank arms 31 and 32 formed integral therewith and provided, at their opposite ends, with outwardly extending crank pins 33. The crank pins 33 are provided with feather keys 35. 36 and 37 are pinions provided with key grooves 36× (see Fig. 22). The pinions 36 and 37 are slipped on to the crank pins 33 so as to engage the keys 35 to hold them from rotation on such crank pins. 38 and 39 are annular gear rings which are secured by the bolts 38× and 39× to the body of the engine so as to be held in a stationary position.

Figure 24:
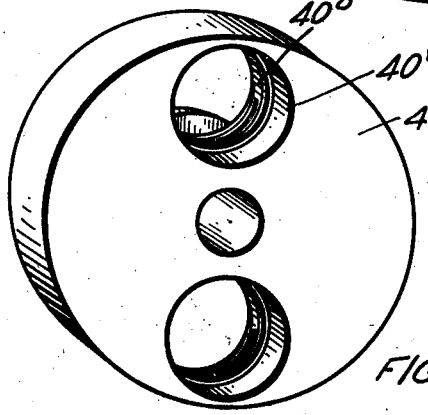
Fig. 24 is a perspective detail of the fly wheel.
Figure 25:
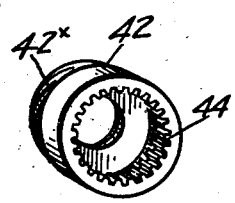
Fig. 25 is a perspective detail of the fly wheel insert.

40 are flywheels one of which is shown in detail in Fig. 24. The flywheels 40 are secured to the shaft 9 at each side of the discs 12 and 13. 41 and 42⁰ are bearing supporting plates, one of which is secured to each flywheel 40 and have diametrically opposed rabbitted orifices in which are held ball bearings 41×. Each flywheel 40 is provided with orifices 40× arranged diametrically opposite each side of the flywheel centre, such orifices being provided with slightly reduced internally threaded portions 40°. 42 are cylindrical inserts fitting the orifices 40° and having reduced externally threaded portions 42× screwed into the threaded portion 40° of the flywheel orifices 40×. The outer face of each insert is recessed to receive a ball bearing 43. The inner end of the insert is provided with an internal annular rack 44 with each of which a gear 36 or 37 is in mesh and between which and the bearing 43 is formed an annular recess 45 for a purpose which will hereinafter appear. The rack 44, recess 45 and bearings 43 and 41× are all in axial alignment.

46 is a short shaft. A shaft 46 is mounted in each pair of bearings 41× and 43. The inner end of each shaft is provided with a crank arm 46× formed integral therewith and recessed at 45° to receive a ball bearing 47 in which the outer ends of the crank arms 33 are journalled. The shafts 46 and crank arms 46× form the outer crank members of the crank system. On the outer end of each shaft 46 is secured a gear wheel 48 so as to revolve with the shaft in mesh with the stationary racks 38 and 39. The gear 48 and rack 38 have a gear ratio four to one.

When the centre crank pins 30 are rotated in a counterclockwise direction around the centres formed by the pins 33, the gears 37 are rotated to travel around the rack 44 in a clockwise direction held in mesh therewith by the crank arms 46× revolving in the annular recesses 45 and thereby carrying such crank arms around in the same direction or in an opposite direction to the crank pins 30. By this means the shafts 46 are rotated revolving the gears 48 meshing with the stationary annular racks 38 and 39 in a counterclockwise direction and, therefore, through the flywheels 40 on which the crank mechanisms are carried rotating the drive shaft 9 in a counterclockwise direction. It may be stated that the gears 36 and racks 44 have a gear ratio of one to two.

The engine is started by turning the drive shaft 9 carrying the flywheels 40 therewith. By the rotation of the fly-wheels 40, the gear wheels 48 are rotated as they travel around the stationary rack 38. The rotation of the gears 48 operate the centre crank pins 30 to perform the inward and outward movement by means of the shaft 46, crank arms 46×, gears 36, racks 44, crank pins 33 and crank arms 31 and 32.

The inward and outward movement of the crank pins 30 by means of the slots 26 and 27 in the disc 12 and the slots 28 and 29 in the disc 13 in which this movement takes place, rocks the discs 12 and 13 to advance or recede in the manner previously set forth.

The movement of the crank arms 31 and 32, crank arms 46× and the travel of the gears 37 and 48 in the racks 44, 38 and 39 in relation to the crank pins 30 is illustrated by dotted lines in Figs. 3, 5, 7, 9, 11, 13, 15 and 19, the crank arms 31, gears 37 and racks 44 being illustrated by fine dotted lines and the crank arms 46×, gears 48 and rack 38 being illustrated by comparatively heavy dashed lines. In Figs. 4, 6, 8, 10, 12, 14, 16, 18 and 20 this crank movement is illustrated in perspective showing the successive positions during the drive for one-quarter revolution of the drive shaft 9.

After the engine is started its operation is as follows:—

The power stroke of each of the pistons 18 and 20 imparts a forward concentric movement to the piston carrier disc 13 in which the slots 28 and 29 are located. The pistons 14 and 16 and piston carrier disc 12 have simultaneously a very short forward movement so that as the engine revolves the centre crank pins 30 are forced outwardly longitudinally of the slots 26 and 27 of the disc 12 when engaged by the rear walls of the slots 28 and 29 of the disc 13 as such disc rocks forward in advance of the disc 12 so that the centre cranks 30 successively assume the positions a, b, c, d and e indicated by dotted lines in Fig. 2 as the slots 28 and 29 cut across the slots 26 and 27. Each of these positions is indicated in full lines separately in Figs. 3, 5, 7, 9 and 11. When the crank pin is driven to the position e the outward ends of the slots 28 and 29 lie in registering position with the outer ends of the slots 26 and 27 and the centre crank 30 has been rotated a half revolution around the centre formed by the crank pins 33.

By the movement of the pistons 18 and 20 performing their long power strokes driving the engine an eighth of a revolution and the short strokes of the pistons 14 and 16 carrying such pistons 14 and 16 to the opposite side of the injection orifices 24 and 25, the pistons 14 and 16 connected to the disc 12 become the power or driving pistons for the next eighth of the engine revolution instead of the pistons 18 and 20 connected to the disc 13. The pistons 21 and 19 then act as resisting heads. The power strokes of the pistons 14 and 16 impart a forward movement to the piston carrier disc 12 in which the slots 26 and 27 are located. The piston carrier 13 has simultaneously a very short forward movement so that as the engine revolves the rear walls of the slots 26 and 27 engage the crank pins 30 as the slots 26 and 27 cut across the slots 28 and 29 so that the centre crank pins 30 are forced inward longitudinally of the slots 28 and 29 of the disc 13, the centre crank pins 30 successively assuming the positions f, g, h and i indicated by dotted lines in Fig. 2 rotating the crank pin around the centre formed by the crank pins 33. These positions are separately indicated in full lines in Figs. 13, 15, 17 and 19. The successive drive of the pistons 18 and 20 on one side of the engine and of the pistons 14 and 16 on the opposite side, as above described, complete the one-quarter revolution of the engine drive.

The movement of the crank pin 30 from the position a to position e rotates the crank pins 33 and gears 37 so that they travel one-half revolution around the fly wheel racks 44 and the movement of the crank pin 30 from position e to position i rotates the crank pins 33 and gears 37 so that they travel the other half revolution around the racks 44. By this pinion travel the crank arms 46× are revolved in the same direction or in a direction opposite to the centre crank pin 30 to rotate the shafts 46 and gears 48 so that they travel around the stationary gear rings 38 and 39 carrying the fly-wheel, crank mechanism, piston carriers and pistons in the same direction to rotate the drive shaft 9.

By the power strokes of the pistons 18 and 20, burnt gases ahead of such pistons resulting from a previous firing are forced forward to pass through the exhaust ports 22 and 23. Simultaneously as the pistons 15 and 17 make the short forward movement in unison with the pistons 14 and 16 and such exhaust operation the pistons 19 and 21 moving in unison with the pistons 18 and 20 perform compression strokes coacting with the pistons 16 and 14 as they make their short forward movement thereby compressing the air drawn in by the forward movement of the pistons 14 and 16. The pistons 19 and 21 simultaneously with their aforesaid compression stroke perform induction strokes by drawing fresh air through the exhaust ports behind them. By the power strokes of the pistons 14 and 16 the burnt gases resulting from the power strokes of the pistons 18 and 20 are forced through the exhaust ports 22 and 23, the pistons 15 and 17 performing, at the same time, their combined compression and induction strokes completing the piston operation of the first quarter revolution of the engine.

For the first half of the second quarter of the engine revolution, the pistons 21 and 19 first perform the combined power and exhaust strokes and the pistons 18 and 20 simultaneously perform combined compression and induction strokes. For the second half of the second quarter of the engine revolution, the pistons 17 and 15 perform combined power and exhaust strokes and the pistons 16 and 14 combined compression and induction strokes. For the first half of the third quarter of the engine revolution, the pistons 20 and 18 perform combined power and exhaust strokes and the pistons 19 and 21 combined compression and induction strokes. For the second half of the third quarter of the engine revolution, the pistons 16 and 14 perform the combined power and exhaust strokes and the pistons 15 and 17 the combined compression and induction strokes. For the first half of the fourth quarter of engine revolution, the pistons 19 and 21 perform combined power and exhaust strokes and the pistons 18 and 20 combined compression and induction strokes. For the second half of the fourth quarter of the engine revolution, the pistons 15 and 17 perform combined power and exhaust strokes and the pistons 14 and 16 combined compression and induction strokes thus completing the cycle of engine revolution. As will be seen from referring to Fig. 2 the movement of the crank pin 30 is the same during each quarter revolution of the engine.

The injectors for driving vapourized fuel into the charge of compressed air forced through the orifices 24 and 25 may be of any desired type, that shown being of rotating type and comprising generally an outer cylindrical casing 49 in which is journalled a centre cam shaft 50 driven from the engine drive shaft 9 by the gear 51 meshing with the gears 52 secured to the shafts 53 and connected by bevelled gears 54 and bevelled gears 55 to the cam shafts 50. The cam shaft 50 is provided with a cam 56, operating spring pressed plungers 57 for forcing oil fed into the duct 57× through the ports 58 as the cam releases each plunger at the shoulder 56× thereof. The oil pressure so created raises a needle valve 59 provided with spiral grooves 59× which impart a swirling action to the oil as it is injected in a fine stream through the flaring orifices 24 and 25 and thus atomizing it as it passes into the compressed charge of air in the engine cylinder.

I do not describe these injectors in further detail as they form the subject matter of a separate application.

From this description it will be seen that I have devised an engine in which there will be lack of vibration due to the natural balance of all the parts, in which there is elimination of loss due to reciprocating parts, in which there is a great reduction of moving parts, in which friction is reduced to a minimum, in which there is one hundred per cent of scavenging combined with elimination of loss due to a vacuum on the induction stroke, in which there is excess length of power stroke over compression stroke eliminating power loss and ensuring a silent engine, in which there is extremely high thermal efficiency due to the foregoing and to the great relative increase in piston speed which will result in almost perfect adiabatic thermal curve, and in which there is very great reduction in the weight of the engine in proportion to the power developed, which reduction will be proportionately larger as the power of the engine built is increased.

What I claim as my invention is:—

1. The combination with a stationary engine body, engine shaft, an annular concentric cylinder formed in the engine body, piston carriers mounted freely on the engine shaft and having oppositely curved slots and pistons formed integral with the carriers and operating within the cylinder, of fly wheels secured to the engine shaft, a central crank member engaging a pair of the aforesaid oppositely curved slots and actuated by the movement of the pistons, piston carriers and the curved slots of the carriers to rotate around its own axis, means in the fly wheel for controlling the central crank to rotate evenly during each revolution, and means actuated by the pistons, piston carriers and the central crank for rotating the fly wheels and the engine shaft to which the fly wheels are secured.

2. The combination with the engine body, engine shaft, an annular concentric cylinder within the body and pistons operating in the cylinder and piston carriers freely mounted on the engine shaft, of fly wheels secured to the engine shaft, a centre crank member engaging the carriers, means actuated by the movement of the pistons for causing the centre crank member to rotate on its own axis and revolve about the engine shaft, said means including outer cranks journalled in the fly wheels, a driving connection between the centre crank and outer cranks, stationary annular gears in the engine body concentric to the engine shaft, and a gear secured to each outer crank and meshing with the corresponding stationary annular gear to drive the carriers, parts carried thereby, and engine shaft about its axis.

3. The combination with a stationary engine body and engine shaft rotatably mounted in the body, of a pair of discs loosely mounted on the shaft, pistons carried by the discs for alternately rotating the discs, there being oppositely curved slots in the respective discs, fly wheels secured to the shaft at respective sides of the disc; a centre crank member and outer crank members rotatably connected together, the outer crank members mounted in the fly wheels and the centre crank member being rotated by coacting with the curved slots during the rocking movement of the discs, means for driving the outer crank members from the centre crank member in an opposite direction to the direction of the centre crank member, and means operated by the rotation of the outer crank members for revolving in unison the carriers, fly wheels, parts carried thereby and engine shaft, such means comprising stationary gears carried by the engine body, and pinions secured to the outer crank members and meshing with the stationary gears, and a driving connection between the centre and outer crank members.

4. The combination with a stationary engine body, engine shaft, an annular cylinder formed in the engine body concentric with the shaft, piston carriers loosely mounted on the engine shaft and pistons formed integral with the carriers, there being oppositely curved slots formed in the carriers to convert the oscillating movement of the carriers into a reciprocating movement to and from the engine shaft. the ends of which slots alternately registering, of a central crank member having a crank pin extending through the slots of the carriers and adapted to move to the outer registering ends of the slots as the advance piston makes its forward oscillation and to the inner registering ends of the slots as the rear piston makes its forward oscillation to rotate the crank, a stationary gear secured to the engine body at each side thereof, a driving mechanism including a gear secured to each side of the central crank, an annular internal gear with which each of the crank gears mesh to travel therearound, and a gear secured to the opposite end of the driving mechanism and meshing with the respective stationary gears of the engine body, and means for mounting the driving mechanism on the engine shaft so that as the mechanism is revolved therearound by coaction with the pistons and piston carriers the engine shaft is rotated.

5. In an internal combustion engine, an engine body having an annular cylinder therein, pistons operating in pairs within the cylinder, a fuel inlet between the pistons of each alternate pair at the period of highest compression, air ports in the opposing walls of the cylinder between which at the same period the remaining pairs of pistons are situated, and so formed as to permit of cool air being drawn into the cylinder between the air ports so that a portion passes ahead of the advance piston for compression, a portion behind the rear piston for scavenging, and a portion between the pistons for cooling during the compression of the air ahead of the advance piston.

6. The combination with a stationary engine body, engine shaft, an annular concentric cylinder formed in the engine body, pistons operating in the cylinder, and piston carriers mounted freely on the engine shaft, of outer crank members, each including a shaft and arm, a central crank member having a central crank pin and outwardly extending crank pins journalled in the arms of the outer crank members, members secured to the main shaft in which the shafts of the outer crank members are journalled, means actuated by the oscillations of the piston carriers and coacting with the centre pin of the centre crank member for rotating the centre crank member around its own axis, means actuated by the rotation of the centre crank for rotating the outer crank members in an opposite direction to the centre crank member, and a driving connection between the outer crank members and stationary engine body whereby the engine shaft is rotated.

HUGH McINTYRE.